(12) United States Patent
Haugen

(10) Patent No.: US 10,550,909 B2
(45) Date of Patent: *Feb. 4, 2020

(54) METHODS AND APPARATUS FOR SUSPENSION LOCK OUT AND SIGNAL GENERATION

(71) Applicant: Fox Factory, Inc., Scotts Valley, CA (US)

(72) Inventor: David M. Haugen, Pacific Grove, CA (US)

(73) Assignee: Fox Factory, Inc., Braselton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,749

(22) Filed: Jul. 30, 2018

(65) Prior Publication Data

US 2018/0335102 A1 Nov. 22, 2018

Related U.S. Application Data

(63) Continuation of application No. 14/562,002, filed on Dec. 5, 2014, which is a continuation of application
(Continued)

(51) Int. Cl.
*F16F 9/42* (2006.01)
*B60G 13/14* (2006.01)
(Continued)

(52) U.S. Cl.
CPC ............... *F16F 9/42* (2013.01); *B60G 13/14* (2013.01); *B62K 25/08* (2013.01); *F03G 1/00* (2013.01);
(Continued)

(58) Field of Classification Search
CPC ...... F16F 9/42; F16F 9/062; F16F 9/18; F16F 9/185; F16F 2222/02; F16F 2222/025;
(Continued)

(56) References Cited

U.S. PATENT DOCUMENTS 435,995 A  9/1890 Dunlop
1,492,731 A  5/1924 Kerr
(Continued)

FOREIGN PATENT DOCUMENTS

DE  3532292 A1  3/1987
DE  3709447 A1  10/1988
(Continued)

OTHER PUBLICATIONS

Electronic Translation of DE3709447A1.
(Continued)

*Primary Examiner* — Vishal R Sahni

(57) ABSTRACT

Methods and apparatus for regulating the function of a suspension system are disclosed herein. Suspension characteristics often contribute to the efficiency of a suspended system. Depending on the desired operating parameters of the suspended system, it may be desirable to alter the functional characteristics of the suspension from time to time in order to maintain or increase efficiency. The suspension hereof may be selectively locked into a substantially rigid configuration, and the damping fluid may be phase separated and/or cooled to increase damping rate during use (or offset rate degradation). The suspension hereof may generate power usable to achieve any or all of the foregoing or to be stored for use elsewhere in the suspended system or beyond.

1 Claim, 6 Drawing Sheets

Related U.S. Application Data

No. 14/180,206, filed on Feb. 13, 2014, now Pat. No. 8,925,933, which is a continuation of application No. 13/761,555, filed on Feb. 7, 2013, now Pat. No. 8,684,367, which is a continuation of application No. 12/547,381, filed on Aug. 25, 2009, now Pat. No. 8,393,446.

(60) Provisional application No. 61/091,640, filed on Aug. 25, 2008.

(51) Int. Cl.
    *B62K 25/08*     (2006.01)
    *F16F 9/06*     (2006.01)
    *F03G 1/00*     (2006.01)
    *H02K 7/18*     (2006.01)
    *F16F 9/18*     (2006.01)

(52) U.S. Cl.
CPC .................. *F16F 9/06* (2013.01); *F16F 9/18* (2013.01); *H02K 7/18* (2013.01); *B60G 2204/4604* (2013.01); *B60G 2204/61* (2013.01); *B60G 2300/12* (2013.01); *B60G 2300/60* (2013.01); *B60G 2400/7162* (2013.01); *B60G 2500/104* (2013.01); *B60G 2600/72* (2013.01)

(58) Field of Classification Search
CPC . F16F 2222/06; B60G 13/14; B60G 2300/60; B60G 2400/7162; B60G 2400/716; B60G 2600/72
See application file for complete search history.

(56) References Cited

U.S. PATENT DOCUMENTS

| | | | |
|---|---|---|---|
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 2,018,312 A | 10/1935 | Moulton |
| 2,115,072 A | 4/1938 | Hunt et al. |
| 2,186,266 A | 1/1940 | Henry |
| 2,259,437 A | 10/1941 | Dean |
| 2,492,331 A | 12/1949 | Spring |
| 2,540,525 A | 2/1951 | Howarth et al. |
| 2,559,633 A | 7/1951 | Maurice et al. |
| 2,588,520 A | 3/1952 | Halgren et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,879,971 A | 3/1959 | Demay |
| 2,883,181 A | 4/1959 | Hogan et al. |
| 2,897,613 A | 8/1959 | Davidson et al. |
| 2,941,629 A | 6/1960 | Etienne et al. |
| 2,967,065 A | 1/1961 | Schwendner |
| 2,991,804 A | 7/1961 | Merkle |
| 3,003,595 A | 10/1961 | Patriquin et al. |
| 3,056,598 A | 10/1962 | Sutton Ransom et al. |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,202,413 A | 8/1965 | Colmerauer |
| 3,206,153 A | 9/1965 | Burke |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,621,950 A | 11/1971 | Lutz |
| 3,650,033 A | 3/1972 | Berne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,830,482 A | 8/1974 | Norris |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Yankowski et al. |
| 3,981,204 A | 9/1976 | Starbard et al. |
| 3,981,479 A | 9/1976 | Foster et al. |
| 3,986,118 A | 10/1976 | Madigan |
| 4,022,113 A | 5/1977 | Blatt et al. |
| 4,032,829 A | 6/1977 | Schenavar et al. |
| 4,036,335 A | 7/1977 | Thompson et al. |
| 4,072,087 A | 2/1978 | Mueller et al. |
| 4,103,881 A | 8/1978 | Simich |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,174,098 A | 11/1979 | Baker et al. |
| 4,183,509 A | 1/1980 | Nishikawa et al. |
| 4,287,812 A | 9/1981 | Iizumi |
| 4,291,850 A | 9/1981 | Sharples |
| 4,305,566 A | 12/1981 | Grawunde |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Woelfges |
| 4,570,851 A | 2/1986 | Cirillo et al. |
| 4,572,317 A | 2/1986 | Isono et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |
| 4,647,068 A | 3/1987 | Asami et al. |
| 4,655,440 A | 4/1987 | Eckert |
| 4,657,280 A | 4/1987 | Ohmori et al. |
| 4,659,104 A | 4/1987 | Tanaka et al. |
| 4,660,689 A | 4/1987 | Hayashi et al. |
| 4,673,194 A | 6/1987 | Sugasawa |
| 4,709,779 A | 12/1987 | Takehara |
| 4,729,459 A | 3/1988 | Inagaki et al. |
| 4,732,244 A | 3/1988 | Verkuylen |
| 4,743,000 A | 5/1988 | Karnopp |
| 4,744,444 A | 5/1988 | Gillingham |
| 4,750,735 A | 6/1988 | Furgerson et al. |
| 4,765,648 A | 8/1988 | Mander et al. |
| 4,773,671 A | 9/1988 | Inagaki |
| 4,786,034 A | 11/1988 | Heess et al. |
| 4,815,575 A | 3/1989 | Murty et al. |

(56) References Cited

U.S. PATENT DOCUMENTS

| | | |
|---|---|---|
| 4,821,852 A | 4/1989 | Yokoya |
| 4,826,207 A | 5/1989 | Yoshioka et al. |
| 4,830,395 A | 5/1989 | Foley |
| 4,836,578 A | 6/1989 | Soltis |
| 4,838,306 A | 6/1989 | Horn et al. |
| 4,838,394 A | 6/1989 | Lemme et al. |
| 4,846,317 A | 7/1989 | Hudgens |
| 4,858,733 A | 8/1989 | Noguchi et al. |
| 4,919,166 A | 4/1990 | Sims et al. |
| 4,936,423 A | 6/1990 | Karnopp |
| 4,936,424 A | 6/1990 | Costa |
| 4,938,228 A | 7/1990 | Righter |
| 4,949,262 A | 8/1990 | Buma et al. |
| 4,949,989 A | 8/1990 | Kakizaki et al. |
| 4,958,706 A | 9/1990 | Richardson et al. |
| 4,975,849 A | 12/1990 | Ema et al. |
| 4,984,819 A | 1/1991 | Kakizaki et al. |
| 4,986,393 A | 1/1991 | Preukschat et al. |
| 5,027,303 A | 6/1991 | Witte |
| 5,031,455 A | 7/1991 | Cline |
| 5,036,934 A | 8/1991 | Nishina et al. |
| 5,040,381 A | 8/1991 | Hazen |
| 5,044,614 A | 9/1991 | Rau |
| 5,060,959 A | 10/1991 | Davis et al. |
| 5,072,812 A | 12/1991 | Imaizumi |
| 5,074,624 A | 12/1991 | Stauble et al. |
| 5,076,404 A | 12/1991 | Gustafsson |
| 5,080,392 A | 1/1992 | Bazergui |
| 5,094,325 A | 3/1992 | Smith |
| 5,105,918 A | 4/1992 | Hagiwara et al. |
| 5,113,980 A | 5/1992 | Furrer et al. |
| 5,152,547 A | 10/1992 | Davis |
| 5,161,653 A | 11/1992 | Hare |
| 5,163,742 A | 11/1992 | Topfer et al. |
| 5,178,242 A | 1/1993 | Nakamura et al. |
| 5,186,481 A | 2/1993 | Turner |
| 5,203,584 A | 4/1993 | Butsuen et al. |
| 5,207,774 A | 5/1993 | Wolfe et al. |
| 5,230,364 A | 7/1993 | Leng et al. |
| 5,236,169 A | 8/1993 | Johnsen et al. |
| 5,248,014 A | 9/1993 | Ashiba |
| 5,259,487 A | 11/1993 | Petek et al. |
| 5,263,559 A | 11/1993 | Mettner |
| 5,265,902 A | 11/1993 | Lewis |
| 5,277,283 A | 1/1994 | Yamaoka et al. |
| 5,283,733 A | 2/1994 | Colley |
| 5,284,330 A | 2/1994 | Carlson et al. |
| 5,293,971 A | 3/1994 | Kanari |
| 5,307,907 A | 5/1994 | Nakamura et al. |
| 5,318,066 A | 6/1994 | Burgorf et al. |
| 5,328,004 A | 7/1994 | Fannin et al. |
| 5,347,186 A | 9/1994 | Konotchick et al. |
| 5,348,112 A | 9/1994 | Vaillancourt |
| 5,372,223 A | 12/1994 | Dekock et al. |
| 5,372,224 A | 12/1994 | Samonil et al. |
| 5,381,952 A | 1/1995 | Duprez |
| 5,390,949 A | 2/1995 | Naganathan et al. |
| 5,392,885 A | 2/1995 | Patzenhauer et al. |
| 5,396,973 A | 3/1995 | Schwemmer et al. |
| 5,398,787 A | 3/1995 | Woessner et al. |
| 5,413,196 A | 5/1995 | Forster |
| 5,467,280 A | 11/1995 | Kimura |
| 5,480,011 A | 1/1996 | Nagai et al. |
| 5,487,006 A | 1/1996 | Kakizaki et al. |
| 5,503,258 A | 4/1996 | Clarke et al. |
| 5,542,150 A | 8/1996 | Tu |
| 5,551,674 A | 9/1996 | Johnsen |
| 5,553,836 A | 9/1996 | Ericson |
| 5,578,877 A | 11/1996 | Tiemann |
| 5,588,510 A | 12/1996 | Wilke |
| 5,592,401 A | 1/1997 | Kramer |
| 5,597,180 A | 1/1997 | Ganzel et al. |
| 5,598,337 A | 1/1997 | Butsuen et al. |
| 5,601,164 A * | 2/1997 | Ohsaki ............... B60G 17/002 188/264 CC |
| 5,611,413 A | 3/1997 | Feigel |
| 5,651,433 A | 7/1997 | Wirth et al. |
| 5,657,840 A | 8/1997 | Lizell |
| 5,687,575 A | 11/1997 | Keville et al. |
| 5,697,477 A | 12/1997 | Hiramoto et al. |
| 5,699,885 A | 12/1997 | Forster |
| 5,722,645 A | 3/1998 | Reitter |
| 5,803,443 A | 9/1998 | Chang |
| 5,806,159 A | 9/1998 | Inoue et al. |
| 5,810,128 A | 9/1998 | Eriksson et al. |
| 5,813,456 A | 9/1998 | Milner et al. |
| 5,813,731 A | 9/1998 | Newman et al. |
| 5,816,281 A | 10/1998 | Mixon |
| 5,818,132 A | 10/1998 | Konotchick et al. |
| 5,826,935 A | 10/1998 | Defreitas et al. |
| 5,828,843 A | 10/1998 | Samuel et al. |
| 5,829,733 A | 11/1998 | Becker |
| 5,850,352 A | 12/1998 | Moezzi et al. |
| 5,853,071 A | 12/1998 | Robinson |
| 5,872,418 A | 2/1999 | Wischnewskiy |
| 5,884,921 A | 3/1999 | Katsuda et al. |
| 5,937,975 A | 8/1999 | Forster |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O'Callaghan |
| 5,957,252 A | 9/1999 | Berthold |
| 5,971,116 A | 10/1999 | Franklin |
| 5,988,655 A | 11/1999 | Sakai et al. |
| 5,992,450 A | 11/1999 | Parker et al. |
| 5,996,745 A | 12/1999 | Jones et al. |
| 5,996,746 A | 12/1999 | Turner et al. |
| 5,999,868 A | 12/1999 | Beno et al. |
| 6,000,702 A | 12/1999 | Streiter |
| 6,013,007 A | 1/2000 | Root et al. |
| 6,017,047 A | 1/2000 | Hoose |
| 6,035,979 A | 3/2000 | Foerster |
| 6,050,583 A | 4/2000 | Bohn |
| 6,058,340 A | 5/2000 | Uchiyama et al. |
| 6,067,490 A | 5/2000 | Ichimaru et al. |
| 6,073,536 A | 6/2000 | Campbell |
| 6,073,700 A | 6/2000 | Tsuji et al. |
| 6,073,736 A | 6/2000 | Franklin |
| 6,092,011 A | 7/2000 | Hiramoto et al. |
| 6,092,816 A | 7/2000 | Sekine et al. |
| 6,105,988 A | 8/2000 | Turner et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,152,856 A | 11/2000 | Studor et al. |
| 6,179,098 B1 * | 1/2001 | Hayakawa ............ B60G 17/002 188/274 |
| 6,196,555 B1 | 3/2001 | Gaibler |
| 6,199,669 B1 | 3/2001 | Huang et al. |
| 6,203,026 B1 | 3/2001 | Jones |
| 6,213,263 B1 | 4/2001 | De Frenne |
| 6,215,217 B1 | 4/2001 | Kurosawa et al. |
| 6,217,049 B1 | 4/2001 | Becker |
| 6,219,045 B1 | 4/2001 | Leahy et al. |
| 6,244,398 B1 | 6/2001 | Girvin et al. |
| 6,254,067 B1 | 7/2001 | Yih |
| 6,279,702 B1 | 8/2001 | Koh |
| 6,293,530 B1 | 9/2001 | Delorenzis et al. |
| 6,296,092 B1 | 10/2001 | Marking et al. |
| 6,311,962 B1 | 11/2001 | Marking |
| 6,318,525 B1 | 11/2001 | Vignocchi et al. |
| 6,321,888 B1 | 11/2001 | Reybrouck et al. |
| 6,322,468 B1 | 11/2001 | Wing et al. |
| 6,336,648 B1 | 1/2002 | Bohn |
| 6,343,807 B1 | 2/2002 | Rathbun |
| 6,359,837 B1 | 3/2002 | Tsukamoto et al. |
| 6,360,857 B1 | 3/2002 | Fox et al. |
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |

(56) References Cited

U.S. PATENT DOCUMENTS

| | | |
|---|---|---|
| 6,390,747 B1 | 5/2002 | Commins |
| 6,394,238 B1 | 5/2002 | Rogala |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1 | 7/2002 | Spivey et al. |
| 6,427,812 B2 | 8/2002 | Crawley et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordaninejad et al. |
| 6,520,297 B1 | 2/2003 | Lumpkin et al. |
| 6,527,093 B2 | 3/2003 | Oliver et al. |
| 6,592,136 B2 | 7/2003 | Becker et al. |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,659,240 B2 | 12/2003 | Dernebo |
| 6,659,241 B2 | 12/2003 | Sendrea |
| 6,672,687 B2 | 1/2004 | Nishio |
| 6,701,234 B1 | 3/2004 | Vogelsang et al. |
| 6,732,033 B2 | 5/2004 | Laplante et al. |
| 6,755,113 B2 | 6/2004 | Shih |
| 6,782,980 B2 | 8/2004 | Nakadate |
| 6,817,454 B2 | 11/2004 | Nezu et al. |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,902,513 B1 | 6/2005 | McClure et al. |
| 6,905,203 B2 | 6/2005 | Kremers et al. |
| 6,920,951 B2 * | 7/2005 | Song .................... B60K 25/10 180/165 |
| 6,921,351 B1 | 7/2005 | Hickman et al. |
| 6,923,853 B2 | 8/2005 | Kremers et al. |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | McAndrews |
| 7,025,367 B2 | 4/2006 | McKinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kühnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,208,845 B2 | 4/2007 | Schaefer et al. |
| 7,217,224 B2 | 5/2007 | Thomas |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | McAndrews |
| 7,287,760 B1 | 10/2007 | Quick et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | Laplante et al. |
| 7,306,206 B2 | 12/2007 | Turner |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedetto et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,191,964 B2 | 6/2012 | Hsu et al. |
| 8,201,476 B2 | 6/2012 | Tsumiyama |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,285,447 B2 | 10/2012 | Bennett et al. |
| 8,286,982 B2 | 10/2012 | Plantet et al. |

(56) References Cited

U.S. PATENT DOCUMENTS

| | | |
|---|---|---|
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,328,454 B2 | 12/2012 | McAndrews et al. |
| 8,336,683 B2 | 12/2012 | McAndrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,480,064 B2 | 7/2013 | Talavasek |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,622,180 B2 | 1/2014 | Wootten et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,727,947 B2 | 5/2014 | Tagliabue |
| 8,744,699 B2 | 6/2014 | Yamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,936,139 B2 | 1/2015 | Franklin et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,991,571 B2 | 3/2015 | Murakami |
| 9,033,122 B2 | 5/2015 | Ericksen et al. |
| 9,038,791 B2 | 5/2015 | Marking |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,229,712 B2 | 1/2016 | Takamoto et al. |
| 9,239,090 B2 | 1/2016 | Marking |
| 9,278,598 B2 | 3/2016 | Galasso et al. |
| 9,353,818 B2 | 5/2016 | Marking |
| 9,366,307 B2 | 6/2016 | Marking |
| 9,422,018 B2 | 8/2016 | Pelot et al. |
| 9,452,654 B2 | 9/2016 | Ericksen et al. |
| 9,523,406 B2 | 12/2016 | Galasso et al. |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,784,333 B2 | 10/2017 | Marking |
| 9,975,598 B2 | 5/2018 | Bender et al. |
| 10,036,443 B2 | 7/2018 | Galasso et al. |
| 10,040,329 B2 | 8/2018 | Ericksen et al. |
| 10,072,724 B2 | 9/2018 | Haugen et al. |
| 10,086,670 B2 | 10/2018 | Galasso et al. |
| 10,094,443 B2 | 10/2018 | Marking |
| 10,330,171 B2 | 6/2019 | Cox et al. |
| 10,336,148 B2 | 7/2019 | Ericksen et al. |
| 10,336,149 B2 | 7/2019 | Ericksen et al. |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |
| 2002/0050518 A1 | 5/2002 | Roustaei |
| 2002/0055422 A1 | 5/2002 | Airmet et al. |
| 2002/0063469 A1 | 5/2002 | Nishio |
| 2002/0089107 A1 | 7/2002 | Koh |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2002/0187867 A1 | 12/2002 | Ichida et al. |
| 2003/0001346 A1 | 1/2003 | Hamilton et al. |
| 2003/0001358 A1 | 1/2003 | Becker et al. |
| 2003/0034697 A1* | 2/2003 | Goldner ............. B60G 17/0157 310/17 |
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | Laplante et al. |
| 2003/0191567 A1 | 10/2003 | Gentilcore |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0208687 A1 | 10/2004 | Sicz et al. |
| 2004/0220708 A1 | 11/2004 | Owen et al. |
| 2004/0222056 A1 | 11/2004 | Fox |
| 2004/0256778 A1 | 12/2004 | Verriet |
| 2005/0055156 A1 | 3/2005 | Maltagliati et al. |
| 2005/0077131 A1 | 4/2005 | Russell |
| 2005/0098401 A1 | 5/2005 | Hamilton et al. |
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0124414 A1 | 6/2006 | Hanawa |
| 2006/0136173 A1 | 6/2006 | Case et al. |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |

(56) References Cited

U.S. PATENT DOCUMENTS

| | | |
|---|---|---|
| 2006/0237272 A1 | 10/2006 | Huang |
| 2006/0253210 A1 | 11/2006 | Rosenberg |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | McAndrews et al. |
| 2007/0088475 A1 | 4/2007 | Nordgren et al. |
| 2007/0090518 A1* | 4/2007 | Sauciuc .............. H01L 23/38 257/706 |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0239479 A1 | 10/2007 | Arrasvuori et al. |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0109158 A1 | 5/2008 | Huhtala et al. |
| 2008/0116622 A1 | 5/2008 | Fox |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0001684 A1 | 1/2009 | McAndrews et al. |
| 2009/0020382 A1 | 1/2009 | Van Weelden et al. |
| 2009/0038897 A1 | 2/2009 | Murakami |
| 2009/0048070 A1 | 2/2009 | Vincent et al. |
| 2009/0069972 A1 | 3/2009 | Templeton et al. |
| 2009/0070037 A1 | 3/2009 | Templeton et al. |
| 2009/0071773 A1 | 3/2009 | Lun |
| 2009/0098981 A1 | 4/2009 | Del et al. |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0258710 A1 | 10/2009 | Quatrochi et al. |
| 2009/0261542 A1 | 10/2009 | McIntyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0324327 A1 | 12/2009 | McAndrews et al. |
| 2010/0004097 A1 | 1/2010 | D'Eredita |
| 2010/0010709 A1 | 1/2010 | Song |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1* | 3/2010 | Haugen ............... B60G 13/14 280/124.157 |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0327542 A1 | 12/2010 | Hara et al. |
| 2011/0067965 A1 | 3/2011 | McAndrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0257848 A1* | 10/2011 | Shirai .................. B62K 19/36 701/49 |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0080279 A1 | 4/2012 | Galasso et al. |
| 2012/0136537 A1 | 5/2012 | Galasso et al. |
| 2012/0181126 A1 | 7/2012 | De Kock |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0081171 A1 | 3/2015 | Ericksen et al. |
| 2015/0175236 A1 | 6/2015 | Walthert et al. |
| 2015/0197308 A1 | 7/2015 | Butora et al. |
| 2015/0291248 A1 | 10/2015 | Fukao et al. |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0247072 A1 | 8/2017 | Laird et al. |
| 2017/0259876 A1 | 9/2017 | Ericksen et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0326808 A1 | 11/2018 | Ericksen et al. |
| 2018/0328442 A1 | 11/2018 | Galasso et al. |

(56) References Cited

U.S. PATENT DOCUMENTS

| | | |
|---|---|---|
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355946 A1 | 12/2018 | Ericksen et al. |
| 2019/0030975 A1 | 1/2019 | Galasso et al. |
| 2019/0032745 A1 | 1/2019 | Marking |
| 2019/0184782 A1 | 6/2019 | Shaw et al. |

FOREIGN PATENT DOCUMENTS

| | | |
|---|---|---|
| DE | 3711442 A1 | 10/1988 |
| DE | 3738048 A1 | 5/1989 |
| DE | 3924166 C1 | 2/1991 |
| DE | 4029090 A1 | 3/1992 |
| DE | 4406918 A1 | 9/1994 |
| DE | 202004005229 U1 | 8/2004 |
| DE | 10326675 A1 | 12/2004 |
| DE | 102005025811 A1 | 12/2006 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 552568 A1 | 7/1993 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1757473 A2 | 2/2007 |
| EP | 1825220 A2 | 8/2007 |
| EP | 2103512 A2 | 9/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| FR | 2432424 A1 | 2/1980 |
| FR | 2529002 A2 | 12/1983 |
| FR | 2617928 A1 | 1/1989 |
| FR | 2952031 A1 | 5/2011 |
| GB | 2104183 A | 3/1983 |
| GB | 2159604 A | 12/1985 |
| GB | 2180320 A | 3/1987 |
| GB | 2289111 A | 11/1995 |
| JP | 57173632 A | 10/1982 |
| JP | 57173632 U | 11/1982 |
| JP | 57182506 A | 11/1982 |
| JP | 01106721 A | 4/1989 |
| JP | H0193637 A | 4/1989 |
| JP | H02168038 A | 6/1990 |
| JP | H102168038 A | 6/1990 |
| JP | H03113139 A | 5/1991 |
| JP | 04203540 A | 7/1992 |
| JP | 05149364 A | 6/1993 |
| JP | 06101735 A | 4/1994 |
| JP | 06185562 A | 7/1994 |
| JP | H084818 A | 1/1996 |
| JP | 2005119548 A | 5/2005 |
| JP | 2005119549 A | 5/2005 |
| JP | 2007302211 A | 11/2007 |
| JP | 2008238921 A | 10/2008 |
| KR | 20070076226 A | 7/2007 |
| WO | 9840231 A2 | 9/1998 |
| WO | 99/06231 | 2/1999 |
| WO | 0027658 A1 | 5/2000 |
| WO | 03070546 A1 | 8/2003 |
| WO | 2007017739 A2 | 2/2007 |
| WO | 2007117884 A2 | 10/2007 |
| WO | 2008086605 A1 | 7/2008 |
| WO | 2008114445 A1 | 9/2008 |

OTHER PUBLICATIONS

English language abstract for EP 0207409 (no date).

Fachkunde Fahrradtechnik 4 Auflage, Gressmann_Inhaltv und S, 2011, 206-207.

Statement of Grounds of Appeal, EP App. No. 11153607.4, May 28, 2018, 88 Pages.

European Search Report, European Patent Application No. 14189773.6, dated May 4, 2015, 4 Pages.

Grounds of Appeal, EP App. No. 11153607.4, Jun. 1, 2018, 28 Pages.

EP Search Report for European Application No. 15163428.4, dated Jul. 3, 2017, 7 Pages.

"Communication Re Oral Proceedings for European Application No. 10161906, dated Feb. 15, 2013 (Feb. 15, 2013)".

"European Patent Office Final Decision dated Mar. 21, 2013", European Patent Application No. 10161906.2.

"European Search Report for European Application No. 10161906, 3 pages, dated Sep. 15, 2010 (Sep. 15, 2010)".

"European Search Report for European Application No. 10187320, 12 pages, dated Sep. 25, 2017 (Sep. 25, 2017)".

"European Search Report for European Application No. 11153607, 3 pages, dated Aug. 10, 2012 (Aug. 10, 2012))".

"European Search Report for European Application No. 11172553, 2 pages, dated Sep. 25, 2017 (Sep. 25, 2017)".

"European Search Report for European Application No. 11175126, 2 pages,dated Sep. 25, 2017 (Sep. 25, 2017)".

"European Search Report for European Application No. 11275170, 2 pages, dated Jan. 10, 2018 (Jan. 10, 2018)".

"European Search Report for European Application No. 12170370, 2 pages, dated Nov. 15, 2017 (Nov. 15, 2017)".

"European Search Report for European Application No. 12184150, 10 pages, dated Dec. 12, 2017 (Dec. 12, 2017)".

"European Search Report for European Application No. 13158034, 4 pages, dated Jun. 28, 2013 (Jun. 28, 2013))".

"European Search Report for European Application No. 13174817.0, 13 pages, dated Jan. 8, 2018 (Jan. 8, 2018))".

"European Search Report for European Application No. 15167426, 4 pages, dated Sep. 18, 2015 (Sep. 18, 2015))".

"European Search Report for European Application No. 17188022, 9 pages, dated Feb. 1, 2018 (Feb. 1, 2018))".

"European Search Report and Written Opinion, European Patent Application No. 13165362.8", dated Sep. 24, 2014, 6 Pages.

"Office Action for European Application No. 13158034.2, 5 pages, dated May 22, 2014".

Nilsson, "Opposition Letter Against EP-2357098", Oct. 13, 2017, 7.

Puhn, "How to Make Your Car Handle", HPBooks, 1981, 7 Pages.

Shiozaki, et al., "SP-861—Vehicle Dynamics and Electronic Controlled Suspensions SAE Technical Paper Series No. 910661", International Congress and Exposition, Detroit, Mich., Feb. 25-Mar. 1, 1991.

Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.

U.S. Appl. No. 61/175,422, filed May 4, 2009, Mario Galasso et al., 17 Pages.

U.S. Appl. No. 61/302,070, filed Feb. 5, 2010, Mario Galasso et al., 39 Pages.

"Basis for Claims Filed Jan. 23, 2015", European Patent Application No. 14189773.6, 2 Pages.

"17 Years of Innovation and Still Evolving", https://www.powertap.com/post/blog-15-17-years-of-innovation-and-still-evolving, Nov. 28, 2018, 8 Pages.

"ANT Message Protocol and Usage", Dynastream Innovations, Inc., Jul. 2, 2007, 68 Pages.

(56) References Cited

OTHER PUBLICATIONS

Thum, Notice of Opposition to a European Patent, EP App. No. 14189773.6, Dec. 13, 2018, 49 Pages.
"European Search Report for European Application No. 09177128, 4 pages, dated Aug. 25, 2010 (Aug. 25, 2010)".
"European Search Report for European Application No. 11172612 , 2 pages, dated Oct. 6, 2011 (Oct. 6, 2011))".
"European Search Report for European Application No. 13189574, 2 pages, dated Feb. 19, 2014 (Feb. 19, 2014)".
"European Search Report for European Application No. 16167306 , 2 pages, dated Mar. 23, 2017 (Mar. 23, 2017)".
"European Search Report for European Application No. 17154191, 2 pages, dated Jun. 28, 2017 (Jun. 28, 2017)".
"European Search Report for EP Application No. 18154672, 3 pages, dated Aug. 28, 2018 (Aug. 28, 2018))".
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Thum, "Oppostion Letter Against EP2357098", Oct. 16, 2018, 39.
Waechter, et al., "A Multibody Model for the Simulation of Bicycle Suspension Systems", Vehicle System Dynamics vol. 37, No. 1, 2002, 3-28.
European Search Report for European Application No. 19157767, dated Oct. 16, 2019, 9 Pages.

* cited by examiner

METHODS AND APPARATUS FOR SUSPENSION LOCK OUT AND SIGNAL GENERATION

CROSS-REFERENCE TO RELATED APPLICATIONS

This application is a continuation application of and claims the benefit of co-pending U.S. patent application Ser. No. 14/562,002 filed on Dec. 5, 2014 entitled "METHODS AND APPARATUS FOR SUSPENSION LOCK OUT AND SIGNAL GENERATION" by David M. Haugen, and assigned to the assignee of the present application, which is incorporated herein, in its entirety, by reference.

The U.S. patent application Ser. No. 14/562,002 is a continuation application of and claims the benefit of U.S. patent application Ser. No. 14/180,206 filed on Feb. 13, 2014 and is now U.S. Pat. No. 8,925,933, entitled "METHODS AND APPARATUS FOR SUSPENSION LOCK OUT AND SIGNAL GENERATION" by David M. Haugen, and assigned to the assignee of the present application, which is incorporated herein, in its entirety, by reference.

This U.S. Pat. No. 8,925,933 is a continuation application of and claims the benefit of U.S. patent application Ser. No. 13/761,555 filed on Feb. 7, 2013 and is now issued U.S. Pat. No. 8,684,367, entitled "METHODS AND APPARATUS FOR SUSPENSION LOCK OUT AND SIGNAL GENERATION" by David M. Haugen, and assigned to the assignee of the present application, which is incorporated herein, in its entirety, by reference.

The U.S. Pat. No. 8,684,367 is a continuation application of and claims the benefit of U.S. patent application Ser. No. 12/547,381 filed on Aug. 25, 2009 and is now issued U.S. Pat. No. 8,393,446, entitled "METHODS AND APPARATUS FOR SUSPENSION LOCK OUT AND SIGNAL GENERATION" by David M. Haugen, and assigned to the assignee of the present application which is incorporated herein, in its entirety, by reference.

The U.S. Pat. No. 8,393,446 claims priority to and benefit of U.S. Provisional Patent Application 61/091,640 filed on Aug. 25, 2008 entitled "MECHANICAL SUSPENSION LOCK OUT" by David M. Haugen, which is incorporated herein, in its entirety, by reference.

FIELD OF THE INVENTION

Embodiments of the invention generally relate to methods and apparatus for selectively operating a suspension component. Some embodiments relate to generating a signal and/or current while operating a suspension component.

BACKGROUND OF THE INVENTION

Suspension systems and more particularly vehicle and bicycle suspension systems have been available for many years. The predominant form of vehicle suspension, and more specifically, bicycle suspension dampers, are telescopic. Suspension systems typically comprise a spring for energy storage and a damping mechanism for energy dissipation. Suspension systems are used to absorb impact and/or vibration in a wide variety of configurations including vehicle seats, vehicle wheels, industrial machinery, watercraft hull/cabin or cockpit interface, bicycle seat posts and many others. Vehicle wheel suspension often includes a damping mechanism for dissipating energy (from wheel movement caused by disparities in the terrain over which the vehicle travels) and a spring mechanism for storing energy for rebound. Damping assemblies often convert wheel movement into heat by means of fluid friction in a fluid filled dashpot (piston and cylinder) type damping device. Spring mechanisms may take many forms including, coiled springs, elastomer bumpers, compressible fluid (e.g. gas, silicone oil), suitable combinations thereof or other suitable energy storage mechanisms. Two wheeled vehicle front forks and rear shocks are designed such that a dampening piston is slidably contained within a cylinder. The cylinder typically contains a damping fluid (e.g. liquid oil) or fluids and the piston typically includes a valve or orifice through which the fluid flows from one side of the piston to the other as the piston moves axially within the cylinder. In typical bicycle suspension forks there are two cylinders and two pistons with one each paired telescopically on either side of a front wheel. Bicycle suspension forks are described in U.S. Pat. Nos. 6,217,049 and 5,186,481, each of which patents is incorporated herein, in its entirety, by reference. A bicycle rear shock unit is described in U.S. Pat. No. 7,147,207 which is incorporated herein, in its entirety, by reference.

When a bicycle is equipped with front or rear suspension or both, it will tend to "bounce" in response to the cyclical force exerted on the pedals. There a couple of reasons for that but the result of any bounce is power loss. Suspension "squat" power loss on motorized vehicles may not be significant because the horsepower available is often more than adequate to compensate for the loss while still providing ample usable power. That may not be true of human powered vehicles such as bicycles. A typical adult human in good physical condition can supply approximately one half horsepower to the peddle crank of a bicycle. An elite athlete may supply horsepower approaching 0.6. In any case that isn't much horsepower and any loss is usually noticeable.

Another power loss mechanism involved is that of "chain power squat." When, for example, a chain exerts a forward directed pulling force on the rear sprocket of the bicycle, that force vector will tend to upwardly rotate a rear suspension swing arm about its pivot point at the frame connection if the chain, as it runs between the drive (chain ring) and driven (rear) sprockets, extends above the pivot point. Most often the chain does run above the pivot point and as force is exerted on the chain some of the force is expended in compressing the rear suspension (as the swing arm rotates due to the chain moment).

Another power loss mechanism is the force induced bounce that directly results from the rider's interaction with the pedals. A bicycle rider can usually exert more force downwardly on a pedal than upwardly. That means that the maximum force exerted on the bicycle power crank moves alternately from side to side of the bicycle laterally, as each pedal is pushed through a down stroke. The asymmetric and cyclical nature of the peddling action induces some bounce in both front and rear suspension units on a bicycle. As previously discussed, compression of suspension requires power. That power comes from one source on a bicycle and that is the rider.

In order that a bicycle rider may maximize the power delivered to driving the bicycle forward and minimize suspension compression waste (due to pedal "bob" and/or "squat"), there is a need for suspension units that can act as rigid units when suspension characteristics are not required, yet act to provide shock absorbsion when needed.

As previously mentioned, vehicle suspension systems are often damped by means of a piston traversing a liquid (e.g. hydraulic oil) filled cylinder arrangement. In such arrangement the piston is forced, alternatingly by terrain induced compressive loads and spring induced extension loads, through the liquid filled cylinder in response to operation of the suspension. Impact energy imparted to the suspension by terrain variation is dissipated by the damping system in the form of heat. Heat, generated by friction between the damping fluid and the traversing piston, builds up in the damping fluid and surroundings as the suspension is cycled. When the suspension is used vigorously, the heat build up can exceed the natural rate of heat transfer from the suspension to the surrounding atmosphere. Such heat build up can adversely affect the operation of the suspension damper. For example, the heat build up in the damping liquid will correspondingly change (e.g. lower) its viscosity and/or shear strength. Such changes can affect the damping force generated (and energy dissipation) by the damping piston during operation and may render the damping mechanism ineffective.

Accordingly there is a need for a selectively rigid suspension unit. Further, there is a need for a suspension unit that can be placed in a rigid condition without relying on hydraulic or other fluid lock out. There is a need for a vehicle suspension having increased heat dissipation characteristics. Further there is a need for a vehicle suspension unit that can convert vehicle movement to electric power. Further there is a need for a vehicle suspension unit that can use power generated therein to increase performance of the suspension.

SUMMARY OF THE INVENTION

Some embodiments of the present invention include methods and apparatus for mechanically fixing one part of a suspension mechanism to another part of the suspension mechanism such that the parts are substantially unmovable in relation to each other. Some embodiments include methods and apparatus for converting induced suspension movement into usable and/or storable energy such as electric current/voltage. Some embodiments include methods and apparatus for transferring heat from a suspension and further include methods and apparatus for generating power required to operate heat transfer enhancement mechanisms. Some embodiments include methods and apparatus for automatically regulating power generation and/or heat transfer enhancement. Some embodiments include methods and apparatus for adjusting damping fluid flow rates to change damping rates in proportion to changes in suspension temperature. Some embodiments include dynamically adjustable dampening fluids for altering damping rates in proportion to external input. Some embodiments include methods and apparatus for separating gas and liquid phases of damping fluid to tend to return damping fluid to a pre-use state.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only certain embodiments and are therefore not to be considered limiting, for the invention may admit to other equally effective embodiments.

DETAILED DESCRIPTION OF THE PREFERRED EMBODIMENT

One embodiment hereof will be described as applied to a bicycle fork. It will be appreciated that such embodiments are equally applicable to rear suspension units or other suspension units that include relatively movable parts that may be selectively immobilized in relation to one another.

Figure 1:
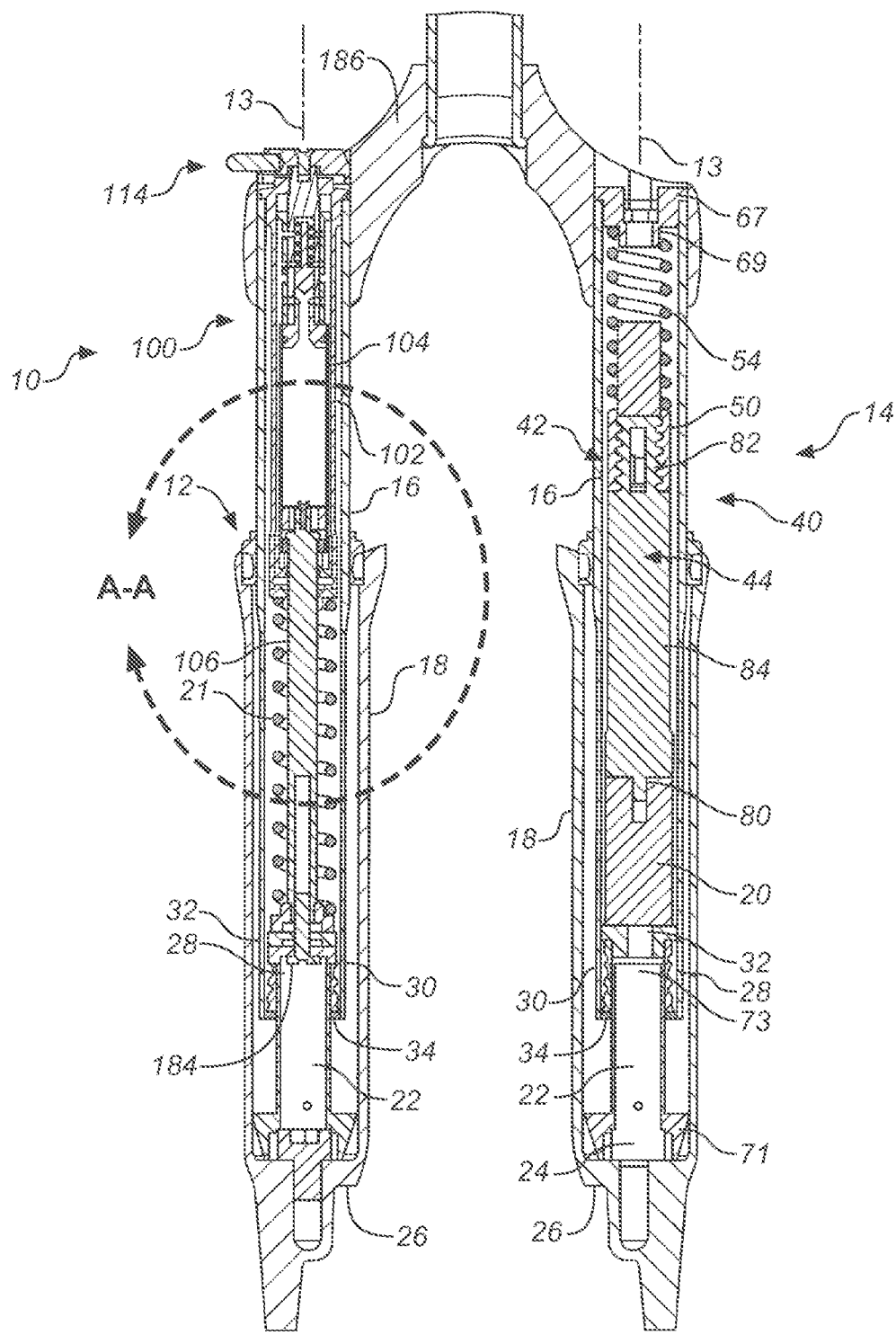
FIG. 1 shows a telescopic bicycle fork.

Referring to FIG. 1 of U.S. Pat. No. 6,217,049; shown is a front fork assembly. A modified copy of the FIG. 1 is included as FIG. 1 herein and has been marked with a view A-A. Inner tube 16 is shown telescopically extending within outer tube 18 wherein the tubes 16, 18 have a substantially common longitudinal axis.

Figure 2:
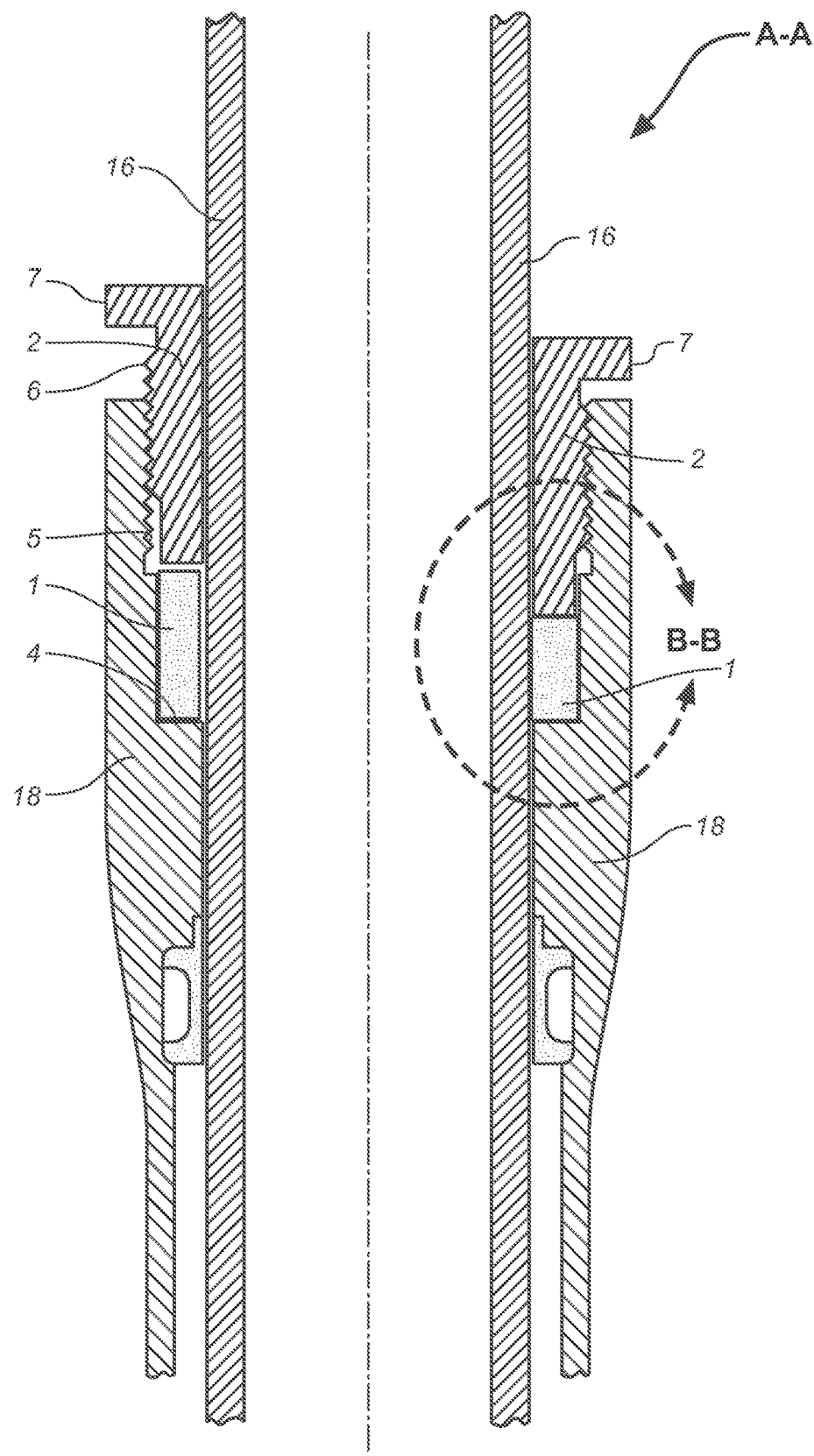
FIG. 2 shows a suspension locking mechanism.

FIG. 2 shows an embodiment of a mechanical suspension lock schematically depicted within portion A-A as specified in FIG. 1 including tubes 16,18 and wiper (not numbered). FIG. 2 shows an embodiment of a system for immobilizing tube 16 relative to tube 18 thereby allowing for selective creation of a rigid fork comprising tubes 16 and 18. The incidence of other dampening components inside the fork tube or tubes is of no consequence regarding the shown embodiment. FIG. 2 shows a modified outer tube 18. The tube 18 includes an annular recess 4 and a substantially incompressible elastic element 1 is contained within the recess 4. The elastic element 1 may comprise any suitable material such as, for example, elastomer, rubber, or thermoplastic. In one embodiment a feature of the elastic element 1 is that due to its substantial incompressibility, and bulk modulus, a first force exerted in one direction one the element will cause corresponding deformation of the element 1, and force exertion by the element 1, in a direction substantially orthogonal to the first force. In lay terms the element 1 may be exemplified as a rubber donut. When compressed axially and constrained radially by the outer surface (inside tube 18) of the recess 4, the compressed donut will bulge inwardly (and exert pressure outwardly against the constraint) until it contacts and becomes constrained by the outer surface of the inner tube 16. Once the element 1 contacts the inner tube 16 it will exert a force (pressure over the area corresponding to the length of contact) on the outer surface of tube 16 proportional in magnitude to the axial compression force exerted on element 1. Such a force can be quite high, particularly if the axial contact length and circumference (area) are significantly great (note: the force can be adjusted by design and one factor is the chosen contact area). The frictional constraint between the element 1 and the tube 16 will be a function of the normal force (or force per unit area) between the parts and the coefficient of friction. By application of a sufficient axial force on element 1, which is contained within and fixed relative to tube 18, the inner tube 16 and the outer tube 18 can be relatively immobilized thereby resulting in a simple and rigidly locked out suspension system. Principles of expanding elastomer elements are described in U.S. Pat. No. 5,813,456 which is incorporated, in its entirety, herein by reference. Note that the principles described therein are in reference to a rubber element that expands radially outward in response to an applied axial force.

In the embodiment of FIG. 2, axial force is applied to the element 1 by a threaded element compression nut 2. A rider may optionally turn the compression nut, for example clockwise, so that right hand inter-engaged threads (compression nut male thread 6 and recess 4 female thread 5) cause the compression nut 2 to move axially deeper into recess 4 thereby compressing element 1 and bulging element 1 into contact with an outer surface of tube 16. The effect of that movement is shown in the "before and after" respectively left and right of centerline views in FIG. 2. Note that the nut 2 is advanced downwardly in the right side view.

In one embodiment axial force is applied to element 1 by means of a cable operated annular ball cam mechanism. In one embodiment nut 2 is replaced by a rotational cam and element 4 is capped by a solid washer (e.g. metallic). Cam balls are interposed between the cam and the washer and the balls are recessed into semi-spherical cavities in the washer (such that they remain in fixed location relative to the washer). The balls are engaged by rotational cam surfaces on the cam nut 2'. A cable is configured to be manually operable from a cockpit of the vehicle and in operation to pull the rotational cam 2' to rotate about the axis of tubes 16, 18. Such rotation causes the cam to force downwardly on the balls thereby exerting an axial force on the washer and correspondingly on element 1. Cylindrical ball cam mechanisms are described in U.S. Pat. Nos. 6,199,669 and 6,520,297, each of which is incorporated herein, in its entirety, by reference.

Figure 3:
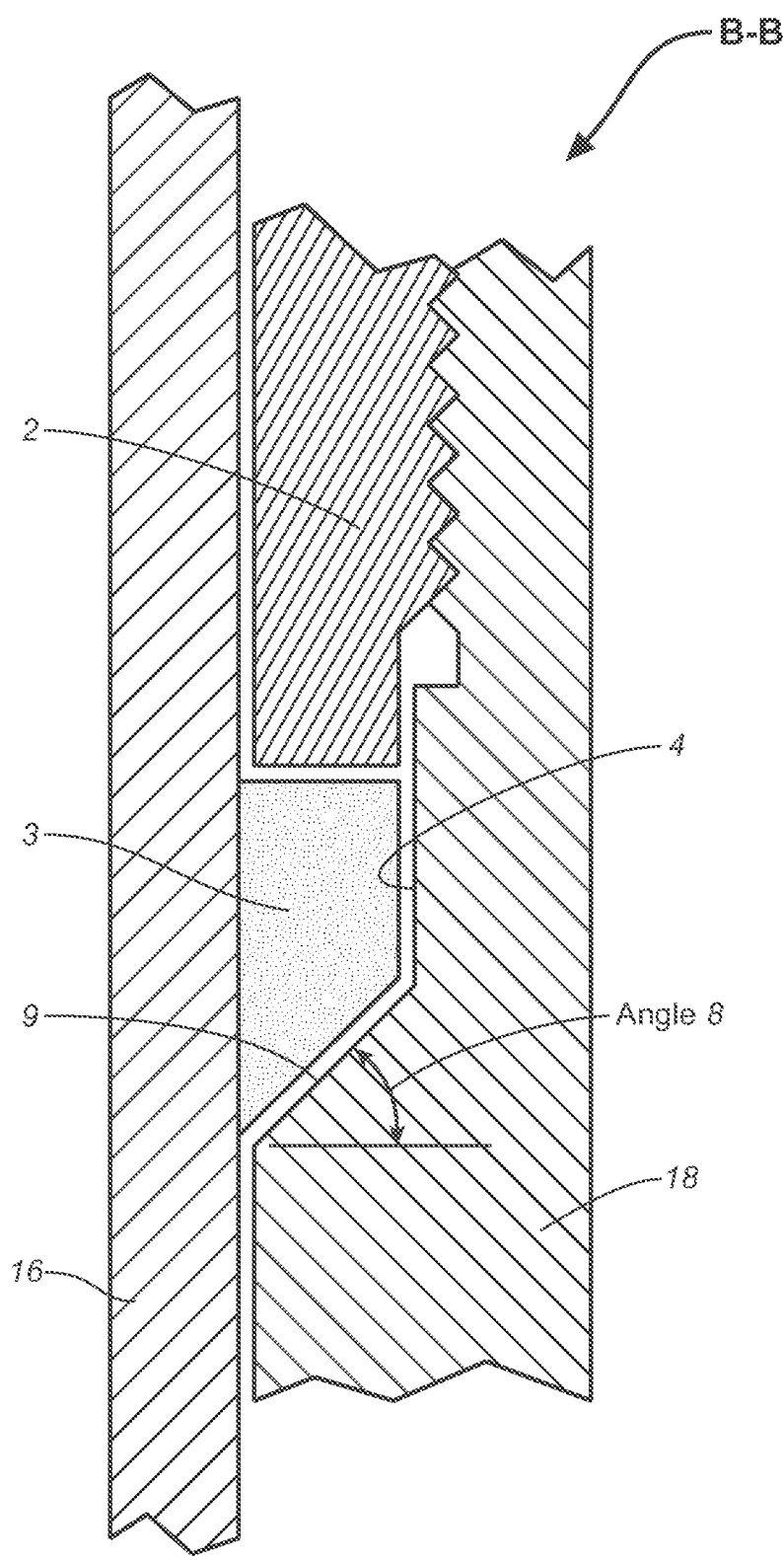
FIG. 3 shows a suspension locking mechanism.

FIG. 3. shows a slightly modified detail section B-B of FIG. 2. The modification of FIG. 3 over FIG. 2 relates to an optional embodiment for the element 1 of FIG. 2 and that element is designated element 3 in FIG. 3. The recess 4 of FIG. 3 has a modified lower surface 9 where that surface is inclined at some angle 8 relative to a plane perpendicular to the longitudinal axis of the tubes 16,18. The element 3 is optionally a solid 'C' shaped ring or segmented ring having an angle corresponding to angle 8 beveled on a lower surface thereof. When element 3 is moved axially downward, by for example compression nut 2 as previously described, the angle on element 3 interacts with the angle 8 thereby urging element 3 radially inward into contact with an outer surface of tube 16. The amount of radial inward force is a function of the force exerted on element 3 by nut 2 and the tangent of angle 8. The axial/radial force relationship may be adjusted using those design variables. It may be appreciated that element 3 may be urged into a diametrical recess (not shown) in a surface of tube 16. It may also be appreciated that any of the components shown to be directed radially inward may be directed radially outward and vice versa. In other words the element 1,3 may be on an exterior recess of an inner tube and the axial force may urge the element radially outward toward an inner surface of an outer tube. Principles of segmented gripping rings or "slips" are described in U.S. Pat. No. 5,813,456 which is incorporated herein, in its entirety, by reference.

While the gripping and immobilizing system embodiments shown herein depict a particular location on a suspension unit it will be appreciated that such components, in the same, or alternative embodiments may be positioned at almost any location inside a suspension dampening fluid chamber or external of such chamber (external example shown) and elsewhere on the suspension so long as two relatively moving components of the suspension are accessible by design for integration of a gripping system. It is appreciated that the suspension to be mechanically locked may be any suitable suspension (e.g. that suspending wheels, seats, integral to seat posts, machinery). It is appreciated that relatively moving parts may be affixed to moving suspension parts for the specific purpose of using such affixed parts for immobilization. It may be appreciated that an elastic element 1 may allow for some vibration damping between tubes 16,18 thereby providing a more comfortable bicycle ride while minimizing pedal bounce.

The U.S. Pat. Nos. 5,186,481, 7,147,207 and 6,217,049, as well as others, describe suspension units in which bounce is minimized (not eliminated) with the use of hydraulic "lock out" valves. Such valves, regardless of specific fork designs or configurations, all operate to close or throttle the damping fluid flow path whereby fluid would normally flow out of a compression side chamber formed by a dampening piston. When the suspension is "locked out" the bounce is the suspension is typically limited by the compressibility of damping fluid "locked in" the compression chamber of the suspension unit. Unfortunately, bounce remains in the system and is the volume of the "locked" compression chamber is large such bounce (system compressibility) can be significant.

Hydraulic lock out suspension systems are equipped with a pressure relief valve that bypasses (or otherwise relives) the lock out valve when pressure in the compression chamber reaches a certain value. That pressure relief valve or "blow off valve" is necessary in case a large force is imparted to the suspension while "locked out." As force is imparted to the locked out suspension pressure in the compression chamber is increased. A large enough force may generate a fluid pressure high enough to damage components of the suspension (e.g. burst the compression chamber). Because the magnitude of possible forces is difficult to limit, a blow off valve is added to relieve over-pressure corresponding to such a force. Blow off valves and related "compression chambers" are described in U.S. Pat. No. 7,163,222 and US Patent Application Publication No 2007/0007743, each of which is incorporated herein, in its entirety, by reference.

Because the lock out system and blow off valves of hydraulic lock out systems are fluidic in nature they are subject to malfunction if contaminated by for example particulate matter. Furthermore, the performance of such systems depends on fluid properties such as viscosity and shear strength and those properties are subject to change with time and with temperature.

Because the lock out system is hydraulic, complexity is added to the suspension. Additional components include a lock out valve and associated adjustment controls, a blow off valve and associated adjustment controls and other associated hydraulic system control mechanism feed through and seals.

Figure 4:
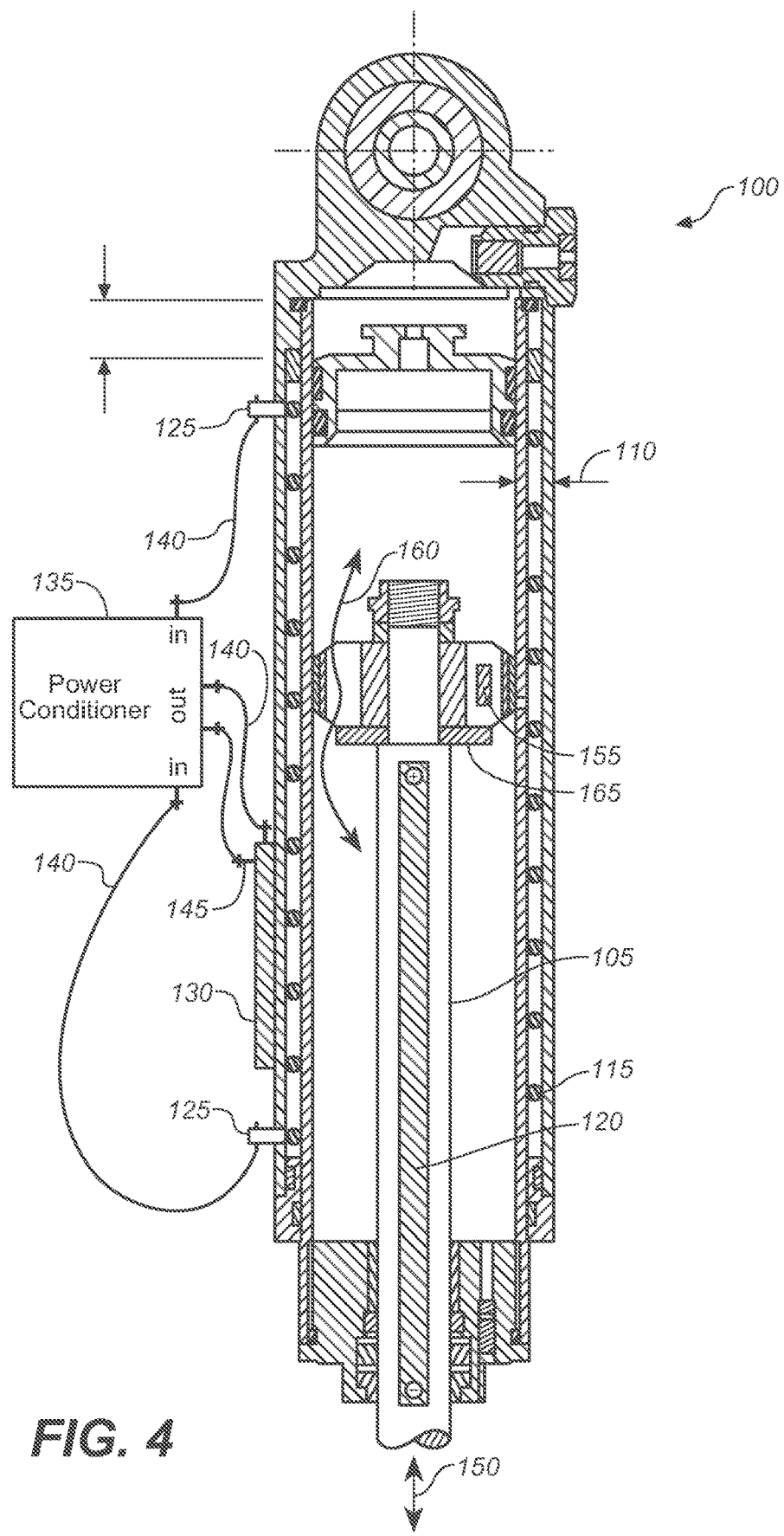
FIG. 4 shows a suspension damper including a linear generator and a cooling circuit.

While the suspension lock out system described herein may be used to limit vehicle movement by "locking" the suspension, one embodiment accommodates issues that are relevant when the suspension is active (i.e. when the lock out is not engaged). Because a vehicle suspension system 100 is, when in use, constantly subjected to alternating forces and is compressed and extended cyclically in response to those forces, such vehicle suspension may, in one embodiment, be configured for use as a bi-directionally acting linear motor. In one embodiment, one of the damping piston rod (shaft) 105 and the damping cylinder 110, or portion thereof or attached thereto (structure through which the piston rod moves axially), is configured to include a wire motor winding 115 and the other of the cylinder 110 or piston rod 105 configured to include one or more permanent magnets 120. The relative and cyclic axial movement between the rod and the cylinder (i.e. the magnet and the winding) produces an electric current within the winding. FIG. 4 shows a suspension 100 including a winding 115 within a wall of a damping cylinder 110 and a permanent magnet 120 within a piston rod 105. The winding power output terminals 125 extend through an out housing of the suspension 100 and are available to conduct generated electric power to its point of use. U.S. Pat. Nos. 6,952,060; 3,842,753; 4,815,575; 3,941,402; 4,500,827; 5,578,877; 5,347,186; 5,818,132; 3,559,027; 3,861,487; 3,921,746; 3,981,204; 5,036,934; 7,569,952; 4,032,829; and 4,387,781, each of which is incorporated, in its entirety, herein by reference, describe various linear generator (e.g. linear motor based) configurations for using reciprocal motion to generate electrical power.

In one embodiment, a cooling circuit 130, such as a thermo-electric generator (e.g. "TEG" described in greater detail herein), is attached to a wall 110 of the damping cylinder to facilitate heat transfer between the cooling circuit 130 and the wall 110. Electric power is conducted, via conductors 140, from the winding terminals 125 to the input terminals of a power conditioner 135. The power conditioner 135 may be any suitable power conditioner, such as for example an AC/DC converter, a DC/DC converter, a transformer, a battery, a capacitor or any suitable combination thereof or other suitable conditioner as may be required to power the cooling circuit 130. Conditioned power is conducted, via conductors 140, from the output terminals of the power conditioner 135 to the input terminals 145 (typical) of the cooling circuit 130. As the piston rod 105 moves back and forth axially in direction 150, the magnet 120 moves relative to the winding 115. That cyclic movement generates and electric current within the winding 115 which as described powers the cooling circuit which in turn conducts heat away from the damper 100.

As an alternative or additional option, piezo electric crystals may be attached to a portion of the piston that is subjected to axial fluid pressure induced forces during operation of the suspension. In one embodiment an area along the piston "skirt" or near the edge where proximity to the walls of the cylinder through which the piston moves, creates a high fluid shear force in the fluid layer between the cylinder and the piston. Such shear stress in the fluid (i.e. viscous drag) operates to deform the piezoelectric crystal thereby generating a current. The piezoelectric structure is deformed cyclically at each reversal of piston direction (cyclic stroke of the suspension) and in response to such deformation the piezo generates a electric current. In one embodiment the piezoelectric structures may be placed on a face or faces (front/back, top/bottom, compression/rebound) of the piston and deformation of the piezo structure(s) is induced by dynamic fluid pressure buildup due to damping force generation. In one embodiment piezoelectric devices are places proximate the ends of the damping cylinder and dynamic fluid pressure generated by damping action acts on those devices during compression and/or rebound pressure buildup. In one embodiment, piezoelectric structures are placed within a damping piston such that fluid flow generates dynamic vibration of the piezoelectric structures and thereby generates electric power. It is noteworthy that while a damping piston and cylinder are used herein to exemplify embodiments of an electric current and/or voltage generating shock absorber, the principles disclosed herein are equally applicable to a gas spring piston and cylinder combination of a suspension. Further, the piezoelectric devices may be places at an end or ends of a compression spring of a vehicle suspension thereby generating current during deformation of the piezoelectric structure under cyclic spring loading and corresponding axial force on the piezoelectric structure. Optionally a mechanical spring such as a coiled spring may comprise and electric winding or permanent magnet of the linear motor described herein. A plurality of piezoelectric devices may be placed on the piston faces and/or the piston skirt or any suitable combination thereof. A vehicle suspension may be equipped with a combination n of piezoelectric generators and linear motor structures. For purposes hereof, discussions of electric motors and generators are substantially interchangeable. In principle an electric motor generates movement when a current is applied thereto. Conversely the same structure will generate electric current when movement is applied thereto. Such is particularly applicable to piezoelectric structures and therefore examples of piezo motors included herein are suitable as examples of electric generators and vice versa. U.S. Pat. Nos. 5,806,159; 5,872,418; and 7,208,845, each of which patents is incorporated, in its entirety, herein by reference, describe piezoelectric generators and motors that are suitable for use in embodiments hereof. FIG. 4 shows a piezoelectric generator 155 (e.g. of the flow operated type described in U.S. Pat. No. 7,208,845) fixed within a fluid flow path 160 through piston 165. As the piston 165 reciprocates, during operation of the damper 100, fluid flowing 160 causes piezo generator 155 to vibrate (e.g. at resonance) thereby generating electric output. Such electric output is conducted, via conductors (not shown) through piston rod 105 and such conductor output terminals may be located at an end (not shown) of piston rod 105. Any suitable combination of the foregoing may be used.

Thermo-Electric generators or "TEG"s are special circuits that EITHER remove heat from one surface (the "cold" surface) of the circuit to another surface (the "hot" surface) upon application of an electric current to the circuit OR generate a current upon application of a temperature differential across the opposing "hot" and "cold" surfaces of the circuit. In one embodiment, TEGs may be based on the Peltier Effect and correspondingly constructed from thin ceramic wafers having alternate P and N doped bismuth telluride sandwiched between them. Such TEGs may be simply constructed using thermoelectric materials such as lead telluride, germanium telluride and cesium telluride. Other thermoelectric effects (and mechanisms usable in accordance herewith) include the Seebeck Effect and the Thomson Effect. U.S. Pat. Nos. 6,141,969; 7,523,617; 5,040,381; and 5,687,575, each of which is incorporated, in its entirety, herein by reference, describe the principles of thermo-electric circuit operation and application.

In one embodiment, as shown in FIG. 4, a damping piston shaft (or rod) 105 and a corresponding damping cylinder 110 are equipped, as disclosed herein or otherwise, to generate electric current (or voltage if open circuit) in response to relative movement there between. At least a portion of the housing of the damping system is equipped with at least one TEG(s) 130 such that the "hot" surface of the TEG is in primary thermal communication with the ambient surroundings of the damping system (or a secondary cooler, or a heat sink, or a combustion engine intake manifold or any environment suitable for heat use or disposal) and the "cold" surface of the TEG 130 is in primary thermal communication with the damping structure (e.g. damping fluid) 110. Such thermal communication may be facilitated by direct contact or may be via a suitable thermal conduit (not shown). A current is generated by operation of the generator equipped suspension 100 and at least a portion of that current is connected to operate the TEG(s) 130. Optionally a heat sink (not shown) may be included and placed in thermal communication with the "hot" side of the TEG 130. Such a heat sink aids in conducting heat away from the suspension 100 and may be equipped with heat dissipation mechanisms such as cooling fins. If the vehicle suspended by such TEG equipped suspension 100 further includes a water cooling (or other powered cooling) system, the heat sink may advantageously be placed in thermal communication with such cooling system.

Typically, a suspension system comprising an electric generating embodiment and TEG(s) as disclosed herein generates more electricity when subjected to extremely "bumpy" terrain versus relatively smooth terrain. Although the bumpy terrain will generate more heat in the suspension (and correspondingly more heat build up potential), the higher current flow, caused by more frequent cycling of the suspension, from the electric generating systems (as disclosed herein) will provide more power to the TEG(s) and will correspondingly result in a greater "heat split" (up to the limit of the TEG) between "hot" and "cold" TEG surfaces. Such greater heat split will result in a higher cooling rate for the suspension. In lay terms: the harder the auto-cooling suspension hereof is worked, the more it will tend to cool itself off.

Optionally the suspension system can be "smart" such that the TEG(s) only activates when needed. In one embodiment a simple temperature sensor (proximate the damping fluid and not shown) and microprocessor (e.g. the power conditioner 135 may include or comprise a programmable or preprogrammed microprocessor and power output switch or modulator) controlled switch turn the TEG on and off or modulate current flow thereto based on operating temperature of the suspension 100. In one embodiment, there is an intermediate cylinder (not shown) mounted coaxially between the piston shaft and the damping cylinder. The intermediate cylinder, rather than (or optionally in addition to) the piston shaft, includes either the magnet or the winding (and/or piezoelectric structures) and the damping cylinder (or air spring cylinder) there around includes the other of the winding or magnets. In such an embodiment, relative axial movement between the intermediate and damping cylinders generates electric current (solely or in addition to other current generating mechanisms present in the suspension thereof). In one embodiment there is a layer of fluid (e.g. damping fluid) between the intermediate cylinder and the damping cylinder. At lower (e.g. ambient or normal operating) temperatures, the viscosity and shear strength of the damping fluid are such that the oscillation of the piston shaft within the intermediate cylinder are insufficient to cause substantial movement of the intermediate cylinder within the damping cylinder (i.e. the fluid between the intermediate and damping cylinders is strong enough that the frictional forces therein maintain a dynamic axial "fix" between the intermediate and damping cylinders). As such, at low temperature no significant electrical current is generated in response to the configuration of the intermediate cylinder within the damping cylinder because they are not relatively movable. When, however, the damping unit heats up in response to more vigorous use, the fluid layer between the intermediate and damping cylinders becomes less viscous (i.e. "thinner") and the frictional force of the piston moving within the intermediate cylinder, in addition to providing damping, causes the intermediate cylinder to move axially relative to the damping cylinder. The relative movement of the intermediate and damping cylinders generates electric current which in turn may operate at least one TEG(s) affixed to the damper. The intermediate and damping cylinders will continue in relative axial movement until the system is sufficiently cooled by the TEG(s) to allow the fluid between those two cylinders to "thicken" and thereby once again "lock" the cylinders from relative axial movement (until they become reheated due to lack of cooling and the cycle begins again).

Optionally a suspension comprises TEG(s) placed suitably in relation to heat generating portions of the suspension and the TEG(s) generate electric current in response to the heating of the suspension in use. The heat generated by the suspension actually powers the TEG, causing it to generate electric current. In FIG. 4 such a configuration would include the TEG 130 wherein the TEG terminals 145 would, in this TEG electric generator embodiment, represent electric output terminals from which usable electricity may be conducted to a suitable power use point (e.g. battery, valve, capacitor). When the TEG electric output leads are shunted or connected to a high current input battery (or capacitor) through a suitable current conditioner (e.g. DC/DC converter) the current flow will facilitate the passive conduction of heat away from the suspension (to be used in generating current). The correspondingly generated current may be used to power "smart" systems associated with the suspension and/or the vehicle generally. Note that any or all of the foregoing electricity generating systems may be used in any suitable combination.

Figure 5A:
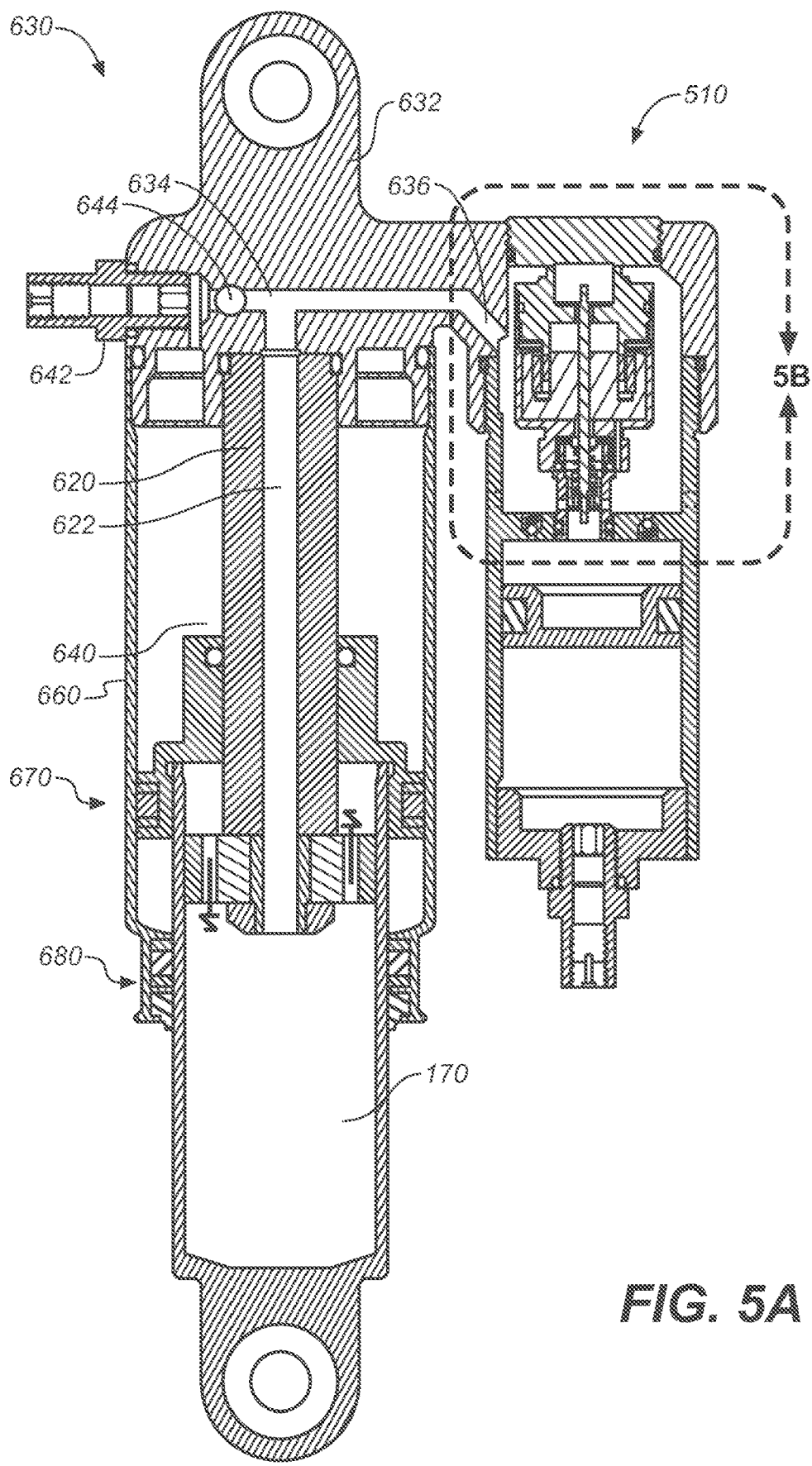
FIG. 5A shows a bicycle shock absorber according to one embodiment.
Figure 5B:
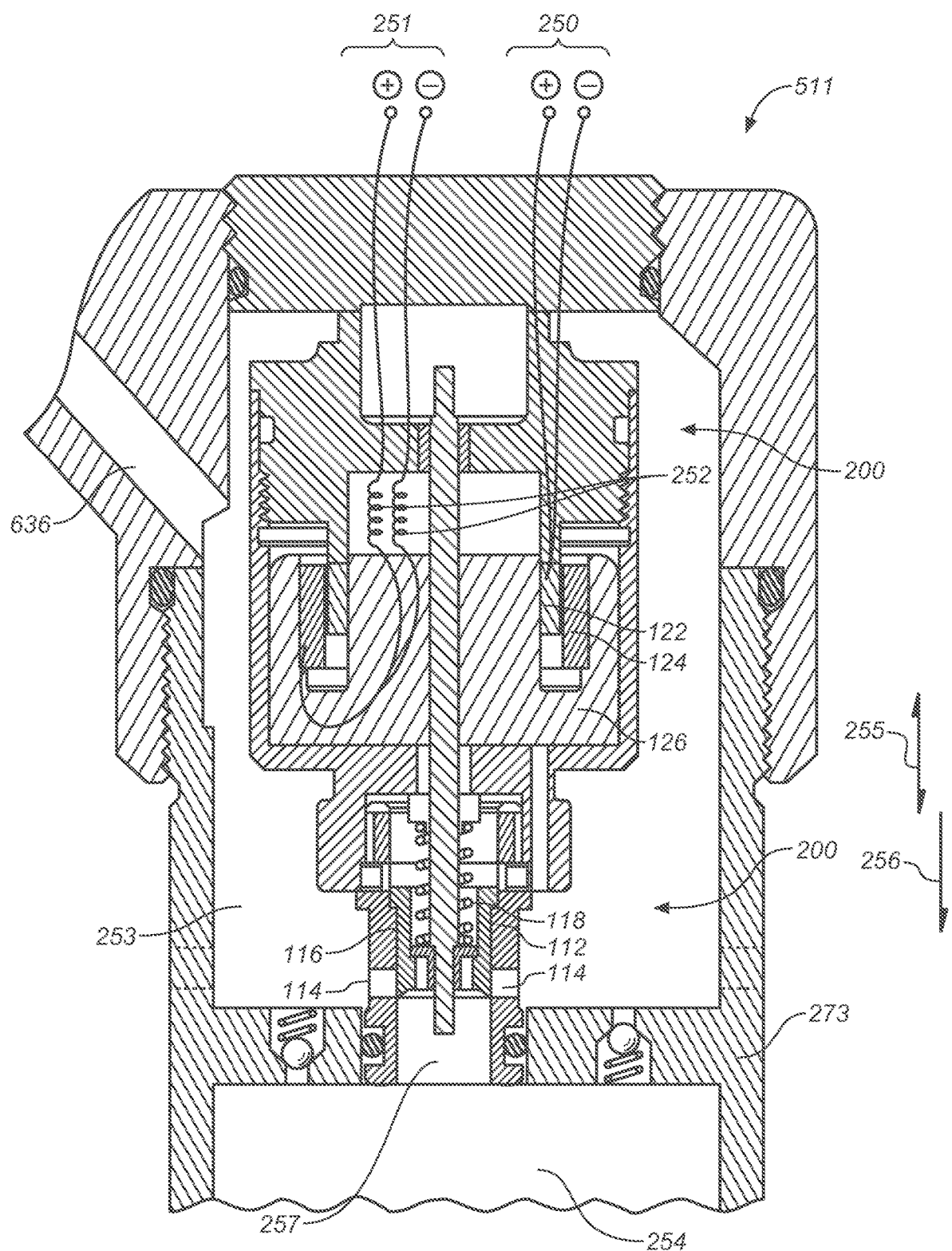
FIG. 5B shows a detailed portion of the shock absorber of FIG. 5A.

U.S. Pat. No. 7,374,028 (the "'028" patent), which is incorporated, in its entirety, herein by reference, describes a bicycle shock absorber having a "piggy back" gas charged damping reservoir. Optionally, electric current and/or voltage generated as disclosed herein may be used to control at least one valve opening(s) within the damping system such that at lower fluid viscosities (e.g. higher temperatures), for example, valves are closed or throttled. FIG. 5A shows a shock absorber of U.S. Pat. No. 7,374,028 subject to the present modification from that patent as shown in FIG. 5B and as further described herein. In one embodiment valves control the flow of damping fluid (and hence the damping rate) and when adjusted may compensate for varying viscosity of the damping fluid. Suspension may include a gas pressure charge or chamber in pressure communication with the damping fluid (e.g. oil) to control or set static damping fluid pressure. As the suspension heats so the gas charge may heat and thereby increase the static pressure of the damping fluid disadvantageously. In one embodiment the cooling system hereof operates to cool the gas charge thereby providing a stable static damping fluid pressure.

Referring to FIG. 5A herein (from the '028 patent), intensifier assembly 510 is shown in conjunction with damper assembly 630. FIG. 5B shows an embodiment of an intensifier valve 511 for use with the principles disclosed herein. In one embodiment the intensifier valve 511 of FIG. 5B replaces the assembly 510, as shown in FIGS. 15, 17 of the '028 patent and elsewhere in the '028 patent. The valve 511 is operable in response to electric current and is capable of being modulated or throttled for selective full opening, closing and intermediate opening or "throttle" positions. Operation of the valve is generally described in U.S. Pat. No. 7,299,112 which is incorporated herein by reference. It should be noted that 122 and 124 are interchangeable such that the voice coil may be either 122 or 124 and the magnet may be the other of 122 and 124 respectively. The voice coil 122 or 124 responds to input current from the power circuit (e.g. position control circuit or other suitable electrical input as described herein). As such input wiring is desirable. The input wiring and terminals for the 122 version of the voice coil is shown at 250. The input wiring and terminals for the 124 version of the voice coil is shown at 251 and includes windings 252 to accommodate extension and contraction of the throughput wires 252 during operation of the valve 200

The valve 200 is shown in a closed, or downward 256, position. As such, piston 116 fully obstructs orifices 114 thereby preventing fluid from flowing from damper assembly 630, through channel 636, into upper chamber 253, through orifice 114, through valve outlet 257 and into floating piston compensator chamber 254. When current of an appropriate magnitude is applied to the voice coil 122 or 124, the magnet electromagnet combination of 122 and 124 causes the back iron 126, and correspondingly the valve piston 116, to move upward 255 in an amount proportional to the voice coil input. Such upward 255 movement is against spring 118, which biases the valve piston 116 downward 256 (i.e. toward closed), and therefore when the voice coil input balances with the force of spring 118, movement of the piston 116 will stop and the valve 200 will be correspondingly throttled.

In operation, referring also to FIG. 4, the sensor (or generator) 155 or 120/115 or both puts out a voltage change corresponding to an induced relative movement of the rod 105 and cylinder 110 of the damper 100. In one embodiment the sensor senses input force along a prescribed axis 150. As described herein. Generated power may be routed though the power conditioner 135 which may in turn send power to the valve of FIG. 5B. In one embodiment, the valve of 5B is biased open (not shown by extending the length of valve 116 downward (direction 256) and placing a hole in 116 adjacent the hole 114, as the valve 116 is moved upwardly by applied electric current, the holes become misaligned thereby closing the valve 511) and is closed gradually in response to increasing power input to terminals 250 or 251. As the shock damper 100 is worked more frequently, it generates more power and heat. The heat causes damping fluid to become thinner. In order to optimize performance as heat increases it is desirable to close the damping fluid valve 511 thereby providing greater restriction to flow and maintaining damping rate. A similar result may be obtained by using TEG 130 in a passive heat removal role as an electric generator. In one embodiment, current is conducted from the TEG to the terminals 251 or 250 of the open biased (not shown but described herein) valve 511. As the TEG heats up it causes a closure of valve 511 in response thereto and thereby compensates (maintains damping rate) the damper for increased temperature.

Referring additionally to FIG. 4, when the sensor 120/115 puts out a voltage corresponding to a bump (and/or optionally a dip) that voltage is transmitted to a processor 135. In one embodiment the shock absorber of FIGS. 4 and 5A and 5B including valve 511 is responsive to signals and power transmitted to the valve (e.g. at 251, 250) from the controller 135. The valve 511 is default in the closed position and will throttle open corresponding to power input received at terminals 250. The processor 135 compares the output voltage of sensor 155 or 120/115 to a preset (by means of threshold adjuster) value and if that value is exceeded, the controller routes a predetermined amount of power from the power source (battery and/or capacitor not shown or 120/115 or 130 or other generator directly) to the valve 511. When the output voltage falls below the threshold value, power to the valve 511 is shut off. Optionally the valve 511 may be of a type described in U.S. Pat. No. 6,073,736 which is incorporated, in its entirety, herein by reference. Optionally, the valve control/power circuit may be configured and operable in a manner such as disclosed in U.S. Pat. Nos. 5,971,116 and 6,073,736 each of which is herein incorporated, in its entirety, by reference, or by any other means or method disclosed herein or any suitable combinations or portions thereof.

In one embodiment a mechanism that transduces temperature change into physical movement is used to operate at least one damping valve(s), thereby compensating the damping rate for temperature changes. Referring to FIG. 5B, and in the context of the herein described application thereof, one embodiment includes a bimetallic (or bi-material composite) spring 118 or element placed in thermal communication with the damping fluid. As the damping fluid heats, during use, the bimetallic element deforms (e.g. curls or bends) in response to the different thermal expansion coefficients of the two dissimilar metals composing the element. The bending or movement of the element is used to operate valve member 116 toward a closed position. In such embodiment a second "regular" spring (not shown) is retained axially, in fixed relation to body 273, within space 257 such that the "regular" spring exerts an axial upward 255 force on valve 116 thereby biasing it open. The bimetal spring 118 must be heated enough by damping fluid so as to overcome the biasing force of the "regular" spring. As such, when the damper is sufficiently cooled the "regular" spring opens the valve 511.

Generally bimetal strips, springs or other elements may be used to operate a valve as desired (e.g. close, open, choke or throttle) within the damping fluid chamber (e.g. on the damping piston) to modulate the damping fluid flow area as desired in view of the temperature induced damping fluid changes. (e.g. close or choke valves to compensate for thinner damping fluid). U.S. Pat. Nos. 5,381,952 and 4,131,657, each of which is incorporated herein, in its entirety, by reference, describe configurations and applications for bimetal actuated valve members.

Optionally, temperature change may converted to physical movement using "shape memory" alloys such as Nitinol (a Raychem trade name for a nickel-titanium shape memory alloy) or certain two phase brass alloys having shape memory characteristics (also available from Raychem). Valve operating mechanisms may comprise shape memory alloys programmed to change shape at a certain "trigger" temperature and thereby operating a damping valve or valves using motion in between their original and programmed shapes. Shape memory alloys may, with minimal if any alteration in design, be used in place of bimetal elements and vice versa as temperature sensitive operational characteristics are similar. The bimetal valve spring as described herein may alternatively be a Nitinol (or other shape memory alloy) spring. U.S. Pat. Nos. 6,840,257; 6,073,700; and 4,570,851 each of which is incorporated herein, in its entirety, by reference, describe configurations and applications for shape memory alloy actuated valve members. In one embodiment, the valve shown in U.S. Pat. No. 6,840,257 may be placed within the flow path 160 of FIG. 4 thereby modulating damping fluid flow through piston 165 in response to damping fluid temperature changes. Optionally the flow path 160 may be substantially closed off except for a flow path through a valve or valves placed therein.

Any valve operator mechanism disclosed herein may be used with one or more valves of a multi-valve damping system (or other suspension system such as spring) such as for example where two valves are open for "cold" temperature suspension operation and one valve is closed for "hot" suspension operation.

Optionally temperature or strain rate (i.e. induced damping rate) compensation mechanisms include shear thickening fluids (liquids). Such liquids increase in strength as shear stress is applied. In one embodiment such a fluid becomes more resistant to flow through an orifice (e.g. in a damping system) as the flow rate requirement or induced damping rate is increased. In lay terms: the harder a suspension, containing a shear thickening damping fluid, is "hit", the more rigid the suspension will behave because the damping force is rate dependent. Electro-thickening or magneto-resistive liquids can be used to a similar end if an electric current is applied to such liquid in proportion to the induced damping rate (the induced damping rate being induced by, and proportional to, the severity of the impact imparted to the suspension). In one embodiment electrical generators as disclosed herein power a magnetic coil surrounding a portion of a magneto-resitive damper. As the suspension is operated, electrical current is generated in proportion to the rate of operation (impact rate) and the current flows through the magnetic coil. The energized magnetic coil causes the magneto-resistive fluid to thicken there by increasing the damping rate. Alternatively a generator as disclosed herein (or a battery/capacitor) is switched to apply current to the magnetic coil when induced operation rates are low (and/or of low amplitude) and to bypass the magnetic coil as induced operation rates increase. As such the suspension will exhibit more damping compliance (lower damping rate) when induced operational rates increase.

When gas becomes entrained in a damping liquid, the apparent density of the emulsified liquid is reduced. That can happen when an "open bath" damper is used vigorously over a period of time. The gas and liquid in the damper become commingled at the gas/liquid interface and as use continues, the intermingled fluid migrates though the damping system until the damping mechanism is at least partially subverted (because less dense fluid flows more rapidly through metering channels and various orifices that facilitate the dampening effect). One option for dealing with entrained gas is to include a mechanical "gas buster" in the fluid flow path within the dampening mechanism. One complicated example of a "gas buster" or separator is a mechanical cyclone. Mixed gas/liquid (e.g. emulsion) enters the cyclone tangentially at a major diameter of the cyclone so that the mixture flows in a substantially tangential spiral within the cyclone. Due to centrifugal force, the less dense gas migrates toward the longitudinal axis of the cyclone (about which flow spirals) and exits the cyclone on the axis at the top. The more dense liquid phase continues in tangential flow downward in a decreasing diameter toward an outlet at the bottom of the cyclone. The "top" and "bottom" of the cyclone are relative though such terms are often used in relation to the earth. In one embodiment, a miniature cyclone is placed on a piston movable through a damping fluid filled cylinder. The top of the cyclone is attached to a flexible, or telescopic, tube that has an outlet end in fluid communication with a region of the suspension damper normally containing gas. The lower end of the cyclone is in fluid communication with a trailing side of the piston and the cyclone inlet is in communication with a leading side of the piston. Such a piston would "scrub" the damping fluid of gas on every stroke of the piston through the damping cylinder. In one embodiment the separator comprises an abrupt 180 degree flow direction change. The principle of the 180 degree bend or flow tube is similar to that of the cyclone in that they both rely on the fact that the kinetic energy of the liquid is greater than the kinetic energy of the gas traveling a the same velocity. A 180 degree bend tube includes exit ports at the bend and the liquid layer, being at the outside radius of the bend, will exit through the ports while the gas will continue though the bend. The separate gas and liquid streams may be disposed of as described herein.

While the foregoing is directed to embodiments of the present invention, other and further embodiments of the invention may be devised without departing from the basic scope thereof, and the scope thereof is determined by the claims that follow.

I claim:

1. A vehicle suspension damper comprising:
a hydraulic damping cylinder comprising an inner wall and an outer wall, said inner wall and said outer wall defining an annular space therebetween;
a cooling circuit having an attachment to an said hydraulic damping cylinder, wherein said attachment is configured to facilitate heat transfer between said cooling circuit and said hydraulic damping cylinder; and
a power conditioner coupled to said cooling circuit and a set of winding terminals that are attached to said hydraulic damping cylinder and a wire motor winding positioned in said annular space between said inner wall and said outer wall, wherein said power conditioner is configured to power said cooling circuit, and wherein conditioned power is conducted, via a set of conduits, from a set of output terminals of said power conditioner to a set of input terminals of said cooling circuit.

* * * * *